April 18, 1967 P. E. DOUBLE 3,314,138
METHOD OF ASSEMBLING A PIERCE NUT IN A PANEL
Original Filed Oct. 10, 1961 2 Sheets-Sheet 1
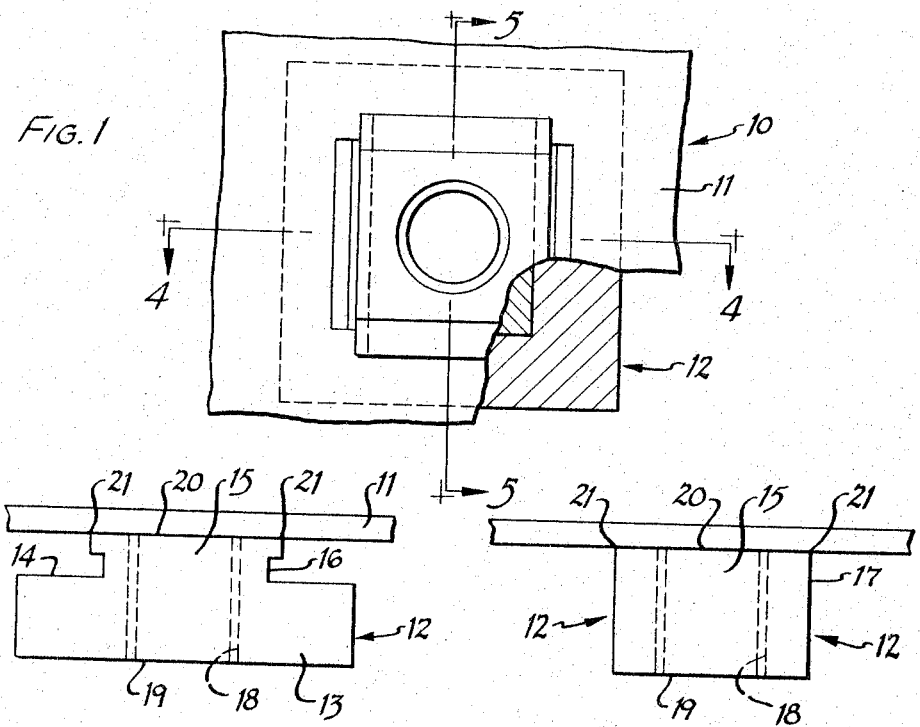
FIG. 1
FIG. 2
FIG. 3
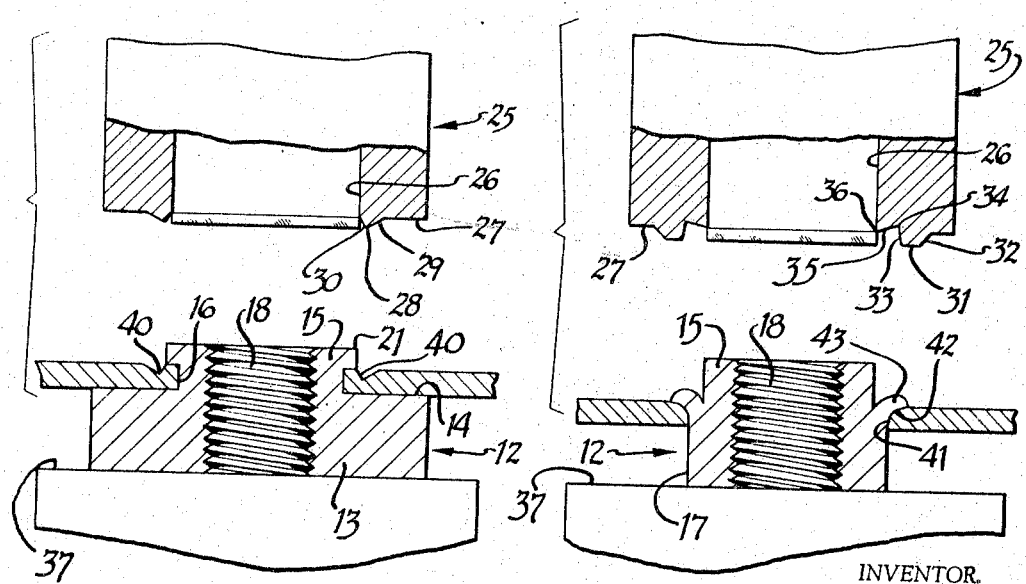
FIG. 4
FIG. 5
INVENTOR.
PLUMMER E. DOUBLE, DECEASED
BY DONALD L. DOUBLE, ADMINISTRATOR
BY WILSON, SETTLE & CRAIG
ATTORNEYS April 18, 1967 P. E. DOUBLE 3,314,138
METHOD OF ASSEMBLING A PIERCE NUT IN A PANEL
Original Filed Oct. 10, 1961 2 Sheets-Sheet 2

INVENTOR.
PLUMMER E. DOUBLE, DECEASED
BY DONALD L. DOUBLE, ADMINISTRATOR

BY WILSON, SETTLE & CRAIG
ATTORNEYS 3,314,138
METHOD OF ASSEMBLING A PIERCE NUT IN A PANEL

Plummer E. Double, deceased, late of Detroit, Mich., by Donald L. Double, administrator, Detroit, Mich., assignor to Multifastener Corporation, a corporation of Michigan
Original application Oct. 10, 1961, Ser. No. 144,132. Divided and this application Apr. 10, 1964, Ser. No. 358,963
2 Claims. (Cl. 29—432.2)

This application is a division of copending application Serial No. 144,132, filed October 10, 1961, now abandoned.

The present invention relates to a method of making a nut-panel assembly.

In a conventional pierce nut installation, a nut having a piercing pilot portion provided with undercut grooves and a pair of laterally projecting flanges is displaced relative to a sheet metal panel to force the nut pilot portion through the panel and to bottom the nut flanges on the panel adjacent the pilot portion. The panel is then swaged or otherwise deformed into the nut grooves to interlock the nut and the panel against separation. Thus, the nut-pilot portion is utilized as a piercing punch, and the nut-to-panel interlock is obtained by panel deformation into preformed grooves in the nut.

The present invention provides a novel method of making a pierce nut and panel assembly wherein the nut not only serves as the piercing punch, but the nut is also deformed after piercing to provide the nut-to-panel interlock. By utilizing this invention, a conventional pierce nut can be staked at its non-grooved and non-flanged side surfaces for increased nut-panel retention. Alternatively, a different form of nut may be used, wherein the nut is provided with a symmetric pilot portion (by elimination of the nut undercut grooves), the nut is deformed to substantially completely overlie the panel portions surrounding the nut pilot portion (to yield an increased nut-to-panel interlock area), and the panel portions bottomed on the nut flange are trapped securely between contiguous nut portions (the massive nut metal being utilized to provide the interlock, rather than the relatively thin sheet metal).

Basically, the process includes the steps of positioning a sheet metal panel in flatwise abutment with the end face of a nut pilot portion, relatively displacing the nut and the panel with the panel in contact with an apertured die to force the nut pilot portion through the panel and to bottom the panel on the nut flange, and then staking or otherwise deforming the nut by its contact with the die after piercing to deform an extended portion of the nut pilot portion outwardly to overlie the panel.

Of course, the basic process is susceptible to substantial variations. For example, the above-described process may be utilized in conjunction with a conventional pierce nut operation. In such an operation utilizing a polygonal nut, two or more sides of the nut pilot portion may be provided with undercut grooves into which the metal is swaged as in a conventional pierce nut operation, while the remaining sides of a nut pilot portion are deformed outwardly to overlie the adjacent portions of the sheet metal. In this manner, a liquid-tight nut-panel assembly can be obtained.

Alternatively, the nut can be provided with a groove located intermediate the pilot portion and the flange and the die can be provided with embossing surfaces for displacing into the nut groove those portions of the sheet metal panel surrounding the pierced aperture therein. Following formation of the embossure, the nut pilot portion can be staked or otherwise outwardly deformed to overlie those portions of the sheet metal panel deformed into the embossure. Since the nut flange lies outside the confines of the nut groove, the nut and the panel are in extended surface contact in surrounding relation to the panel embossment to provide an extremely rigidly reinforced structure in which the panel is effectively trapped by the nut completely around the panel aperture.

Another important object of this invention is the provision of a method of making a nut panel assembly wherein a pierce nut is deformed following piercing through a sheet metal panel into extended surface engagement with the panel.

It is a further object of this invention to provide an improved nut panel assembly wherein a pierce nut serves not only to pierce the panel during assembly but also serves as the sole means retaining the nut and the panel in assembly.

Yet another important object of this invention is the provision of a process for making a nut panel assembly by contacting the nut with a forming die after a previous piercing operation to thereby deform the nut into extended surface engagement with the panel.

An additional, and no less important, object of this invention is the provision of a method of assembling a nut to a panel, the panel being normally planar and the nut having a pilot portion circumscribed by a groove located inwardly of an outer nut flange, by relative movement of the panel and the nut to force the nut pilot portion through the panel to punch an opening therein, embossing the panel portion surrounding the opening into the nut groove and staking the peripheral edges of the nut pilot portion outwardly to overlie the groove, thereby trapping the embossed portion of the panel therein, the nut flange supporting the panel outwardly of the panel embossment.

Other objects of this invention will appear in the following description and appended claims, reference being had to the accompanying drawings forming a part of this specification wherein like reference characters designate corresponding parts in the several views.

On the drawings:

FIGURE 1 is a plan view, with parts broken away and in section, of a nut panel assembly made in accordance with the present invention;

FIGURE 2 is a side elevational view of the nut and the panel prior to assembly;

FIGURE 3 is a side elevational view similar to FIGURE 2 but taken at right angles thereto;

FIGURE 4 is a view of the assembly of FIGURE 1 taken along the plane 4—4 and illustrating the forming die from which the assembly is made;

FIGURE 5 is a view similar to FIGURE 4 taken along the panel 5—5;

Figure 6:
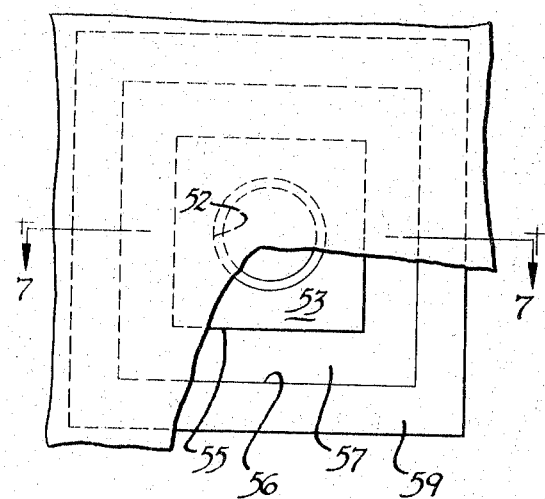
FIGURE 6 is a plan view of a different form of nut and panel taken prior to assembly.
Figure 9:
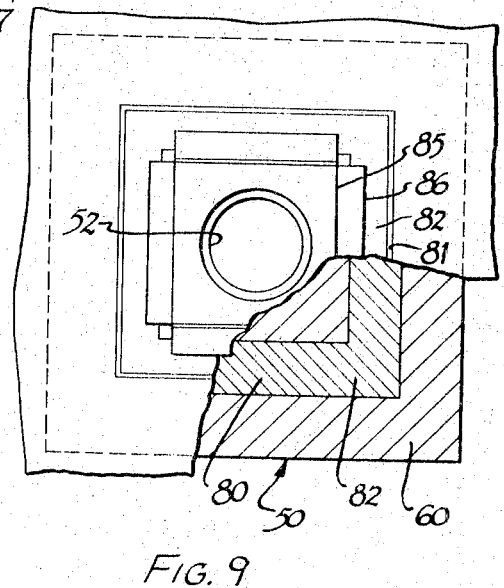
FIGURE 9 is a view of the assembly taken along the plane 9—9 of FIGURE 8.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a nut and panel assembly of the present invention, this assembly consisting of an essentially planar sheet metal panel 11 and a nut indicated generally at 12.

As best illustrated in FIGURES 2 and 3, the nut 12 consists of a generally rectangular body 13 having an upper surface 14 constituting a bottoming flange located generally beneath a pilot portion 15. This pilot portion 15 is also generally rectangular, two opposing vertical side surfaces of the pilot portion having undercut grooves 16 therein (FIGURE 2) and the other vertical side surfaces 17 of said pilot portion being truly planar in configuration and lying perpendicularly to the plane of the flange surface 14. It will be noted that the sides 17 are not grooved and are not flanged.

The nut is provided with a central threaded aperture 18 opening from the bottom face 19 of the nut onto the upper piercing face 20 thereof. Further, the nut is provided with sharp, right-angular cutting edges 21 defined at the extremities of the upper pilot portion face 20 by their intersection with the side walls of the nut pilot portion.

The method of forming the nut panel assembly 10 is well illustrated by a comparison of FIGURES 4 and 5 wherein there is illustrated a forming die 25 having a central, axially extending aperture 26 of substantially the size and contour of the nut pilot portion 15. The lower or active face 27 of the die 25 includes an outer planar peripheral portion extending completely around the lower face of the die.

As shown in FIGURE 2, those edges of this lower face 27 of the die aligned with the recessed faces of the nut 12 are provided with lower cutting edges 28 defined intermediate downwardly and inwardly sloping die faces 29 and downwardly and outwardly sloping die faces 30.

From FIGURE 3, it will be seen that those portions of the die face 27 aligned with the planar side walls 17 of the nut 12 are provided with a lower relatively planar surface 31 merging into the planar outer die surface 27 through upwardly and outwardly inclined faces 32. The inner extremity of the surface 31 is defined by an upwardly and inwardly inclined face 33 terminating at an upper corner 34 displaced vertically above the lower die surface 27. From this corner 37, a staking surface 35 is inclined inwardly and downwardly for juncture with the die aperture 26 in a sharp, acutely angled shearing edge 36.

In the formation of the nut panel assembly the panel 11 is superimposed upon or otherwise contacted with the upper surface 20 of the nut pilot portion, and the nut 12 and the panel 11 are displaced relatively to one another with the panel 11 in contact with the forming face of the die 25. As schematically illustrated in FIGURES 4 and 5, the nut is disposed on support surface 37. Actually, the nut and the panel are initially jointly displaced relative to the die, either by advancing the nut 12 and the panel 11 in contact therewith as illustrated in FIGURE 2 of the drawings into contact with the die or by moving the die into contact with the panel as supported on the nut. Alternatively, the panel can be placed in contact with the die and the nut then displaced into contact with the panel.

The first operation consists in moving the panel 11 relative to the nut 12 to punch the nut pilot portion 15 through the metal to form an aperture in the panel 11 and to bottom the panel 11 on the flange 14 of the nut. That portion of the panel punched therefrom to form the pilot-receiving aperture enters the die bore 26 and does not interfere with subsequent processing.

Continued relative movement of the nut and the panel relative to the die performs two separate and distinct operations. One such operation is brought about by engagement of the die surfaces 29 and 30 with the panel immediately adjacent the panel aperture. The embossed edge 3 of the die indents the panels and swages or otherwise deforms those portions of the panel adjacent the aperture thereof into the undercut recesses 16 of the nut 12. The engagement of the surfaces 29 and 30 with the panel actually depresses the panel, as at 40, and the resultant swaging of the panel will firmly interlock the corresponding two edges of the panels within the recesses 16. This is a conventional pierce nut operation.

The other operation is illustrated in FIGURE 5 of the drawings. Initially the aperture 41 is punched through the panel 11 by the nut pilot portion 15, then depending surface 31 of the die contacts the panel 11, in closely spaced, parallel relation to the adjacent vertical nut pilot side wall 17 to depress the panel over the nut to an extent greater than the depression of the panel portion supported by the nut flanges 14. At the same time, the sharp, acute corner 36 of the die 25 engages the adjacent edge 21 of the nut pilot portion 15, thus causing the upper corner 21 of the straight nut side 17 to be sheared and deformed outwardly as directed by the die surface 35. In this manner, those edges of the pilot portion 15 overlying the straight nut pilot portion sides 17 are staked or otherwise deformed outwardly from the bore 18 to overlie, as at 43, the aperture 41. The outward flow of the staked nut metal, at 43, rounds the aperture edge, as at 42.

Thus, those portions of the sheet metal panel 11 surrounding the nut pilot portion 15 are secured in contact with the nut. Two types of securement are illustrated in conjunction with that embodiment of the invention illustrated in FIGURE 1 of the drawings. First, as illustrated in FIGURE 4 of the drawings, the metal is swaged or otherwise deformed into the nut recesses 16 along opposing sides of the nut. Sheet metal along the remaining sides of the nut pilot portion 15 is contacted by the staked portion 43 of the nut pilot portion 15. Preferably, the acute angular securing or staking edge 36 is coextensive with the entire edge of the nut pilot portion 15, so that the entire side of the nut is deformed, as at 43, to effect substantial surface contact between the nut and the sheet metal. An extremely strong nut-to-panel interlock is provided, not only by the extended surface contact between the nut and the sheet metal, but also by the engagement of the staked portion 43 of the nut and the sheet metal.

In that embodiment of the invention illustrated in FIGURES 6 through 9, the entire nut panel assembly operation is carried out by essentially the same staking technique as illustrated in FIGURE 5 and as heretofore discussed.

More specifically, the nut 50 is rectangular in outline and includes a centrally located, rectangular pilot portion 51 having a coaxial threaded bore 52. The pilot portion has an upper piercing surface 53 terminating in a sharp shearing corner 54 overlying a straight vertical pilot side wall surface 55. The side wall surfaces 55 cooperate with a parallel outer side surface 56 to define therebetween a groove 57 having a planar bottom wall 58. The outer periphery of the nut 50 is defined by a planar upper surface 59 defining the upper extremity of the nut flange 60.

The pilot portion 51, the groove 57 and the flange 59 are all concentric about the axis of the bore 52. Additionally, it will be noted that the thickness of the pilot portion 51, i.e., the distance from the nut planar face 61 to the pilot portion surface 53 is greater than the flange thickness, i.e., the distance from the nut surface 61 to the flange surface 59. This difference in thickness is substantially the same as the thickness of the sheet metal panel 65, for a purpose to be hereinafter more fully described. Further, it will be noted that the bottom surface 58 of the groove 57 is below the surface of the flange 59 and, of course, is below the surface 53 of the pilot portion 51.

Once again, the assembly of the panel 65 and the nut 50 is carried out by utilization of a die 70. This die 70 is rectangular in configuration and includes an outer peripheral flange surface 71. Additionally, the die includes rectilinearly arranged embossing ledges 72, these ledges being defined by outer surfaces 73, inner surfaces 74 and medial or embossing surfaces 75. The inner embossing surface 74 merges through an upper corner 76 with an inwardly and downwardly inclined staking surface 77 terminating in an acute sharpened corner 78. This corner 78 is actually defined by the convergence of the staking surface 77 and an inner shearing surface 79. It will be appreciated that the end face of the die 70 in the illustrated embodiment of the invention consists of four rectilinearly arranged portions similar to that just defined, the portions being spaced and located for alignment with the four edges of the rectangular nut pilot portion 51. In the event that a nut pilot portion of different configuration is utilized, e.g., hexagonal or even circular, a similarly shaped die end face is provided.

Figure 7:
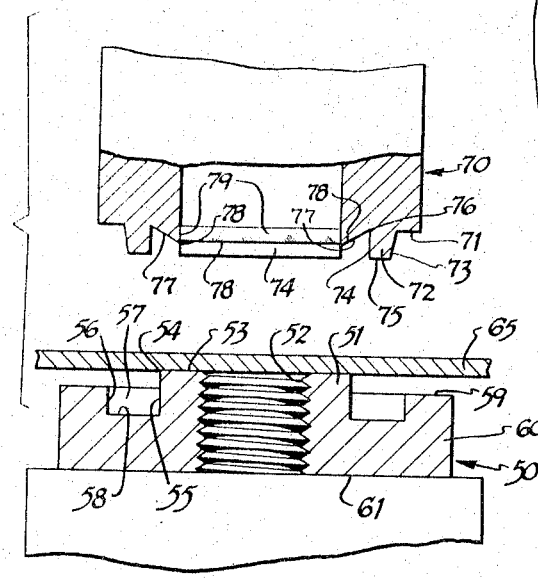
FIGURE 7 is a sectional view taken along the plane 7—7 and also illustrating the forming die.

In operation, the sheet metal panel 65 is superimposed on the pilot surface 53 of the nut 50, and the panel 65, the nut 50 and the die 70 are then displaced relatively from their positions of FIGURE 7. It will, of course, be appreciated that the die 70 may be displaced vertically downwardly from its position of FIGURE 7 into contact with the sheet metal as the sheet metal is supported on the nut or, alternatively, the sheet metal 65 may be interposed between the nut 50 and the die 70, the sheet metal being in contact with either of the other two elements, and the nut is then advanced toward the die.

In any event, initial contact is effected between the embossing surface 75 of the die and the sheet metal panel 65, the sheet metal being at least partially embossed thereby toward the groove surface or bottom 58. Next, and before the embossing surface 75 is effective to fully emboss the panel 65, the nut pilot portion 51 is punched through the sheet metal 65 to form an aperture in the sheet metal conforming to the size and shape of the nut pilot portion 51.

Continued relative nut-to-die movement with the sheet metal 65 interposed therebetween results in displacement of those portions of the sheet metal surrounding the aperture into the groove 58 and engagement between the acute corners 78 of the die and the pilot surface 53 of the nut projecting through the sheet metal aperture. This engagement between the sharpened corners 78 of the die and the surface 53 occurs in proximity to the nut pilot portion corners 54 and results in shearing and outward staking of the peripheral portions of the nut pilot portions 53.

Figure 8:
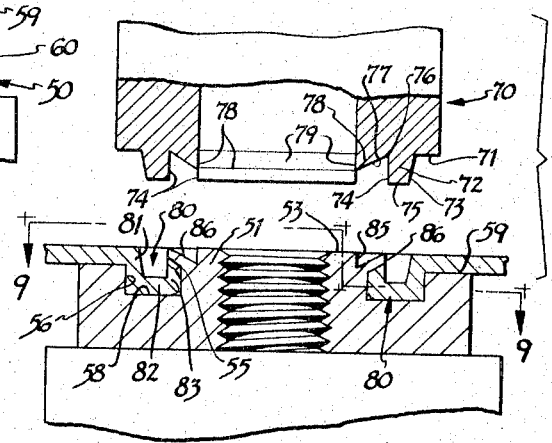
FIGURE 8 is a view similar to FIGURE 7 illustrating the nut and panel after assembly.

As best illustrated in FIGURE 8 of the drawings, the final configuration of the nut panel assembly includes an embossment 80 in the sheet metal surrounding the pilot portion 51 of the nut, this embossment including an outer vertical sheet metal wall 81 engaging the outer wall 56 of the nut recess 57, a sheet metal horizontal portion 82 bottomed in the nut recess against the bottom wall 58 of the groove, and an upturned inner flange 83 formed in the sheet metal against the original vertical side wall 55 of the nut pilot portion 51. Additionally, the upper surface 53 of the nut is sheared and indented by the die edge 78, as at 85, so that the outer edges 54 of the nut pilot portion 51 are staked or otherwise deformed outwardly to overlie the nut groove 57, as at 86, and to trap the sheet metal embossment 80 in the nut groove inwardly of the nut flange 59.

In that embodiment of the invention illustrated in FIGURES 6 through 9, substantially the entire outer periphery of the nut pilot portion is staked or deformed outwardly to overlie the nut groove 57 encircling the nut pilot portion. In addition, the sheet metal is embossed into the groove after the nut has pierced the sheet metal panel and after the panel has been bottomed upon the nut flange surface 59. The resultant later staking of the nut pilot portion traps the embossed portions of the panel in the nut groove 57.

What is claimed is:

1. A method of assembling a rectangular nut having a central rectangular pilot portion and outer flanges to an essentially planar panel, the nut having undercut recesses on two sides only of the pilot portion, by relatively moving the nut and the panel in a single uninterrupted motion sequentially (1) piercing the panel with the nut pilot portion, (2) bottoming the panel outwardly of the recesses on the nut flanges, (3) swaging the panel portions on said two sides of the pilot portion into said recesses and (4) staking outwardly the remaining two sides of the nut pilot portion to overlie the remaining panel portions.

2. In a method of assembling an essentially planar plate and a nut having a face thereof provided with a raised central polygonal pilot portion having opposing sides provided with undercut recesses and other sides planar and outer flanges joined to the recessed nut sides, by relatively displacing the nut and the plate with the plate in contact with a forming die to sequentially perform the steps of (1) punching the nut pilot portion through the plate until the plate bottoms on the nut flange (2) swaging these plate portions adjacent said opposing sides of the pilot portion of the nut into the nut recesses, and (3) smoothly and continuously deforming outwardly the upper outer edges of the planar sides of the nut pilot portion to overlie the remainder of the plate portion surrounding the nut pilot portion.

References Cited by the Examiner

UNITED STATES PATENTS

| | | | |
|---|---|---|---|
| 2,652,942 | 9/1953 | Muchy. | |
| 2,750,660 | 6/1956 | Newcomb | 151—41.73 X |
| 3,229,363 | 1/1966 | Bien | 29—432 |

FOREIGN PATENTS

| | | |
|---|---|---|
| 539,221 | 4/1957 | Canada. |

CHARLIE T. MOON, *Primary Examiner.*